United States Patent [19]

Bass

[11] Patent Number: 4,716,993
[45] Date of Patent: Jan. 5, 1988

[54] DISC BRAKE

[75] Inventor: Richard A. Bass, Warwick, England

[73] Assignee: Automotive Products plc, Leamington Spa, England

[21] Appl. No.: 825,697

[22] Filed: Feb. 4, 1986

Related U.S. Application Data

[63] Continuation of Ser. No. 571,724, Jan. 18, 1984, abandoned.

[30] Foreign Application Priority Data

Aug. 29, 1981 [GB] United Kingdom ............... 8126424
Mar. 18, 1982 [GB] United Kingdom ............... 8207952

[51] Int. Cl.⁴ .................... B60T 1/06; B60T 11/00; F16D 55/00; A63C 17/12
[52] U.S. Cl. .................... 188/18 A; 188/26; 188/73.32; 188/344; 301/6 V; 301/6 WB; 403/338; 403/354
[58] Field of Search .................... 188/17, 18 A, 24, 12, 188/26, 218 XL, 18 R, 27, 72.4, 73.31, 73.32, 73.33, 369, 114, 370, 205 R, 358, 344, 361, 73.45; 301/6 W, 6 V, 6 E, 6 R, 6 WB; 403/338, 337, 354, 356

[56] References Cited

U.S. PATENT DOCUMENTS

| | | | |
|---|---|---|---|
| 2,130,868 | 9/1938 | Babel | 188/369 X |
| 3,022,867 | 2/1962 | Maloney et al. | 188/218 X |
| 3,405,784 | 10/1968 | Biabaud | 188/18 A |
| 3,709,561 | 1/1973 | DeBiasse et al. | 301/6 V X |
| 4,022,297 | 5/1977 | Haraikawa | 188/26 |
| 4,232,764 | 11/1980 | Yamamoto | 188/73.32 |
| 4,260,082 | 11/1982 | Haraikawa et al. | 188/344 X |

FOREIGN PATENT DOCUMENTS

| | | |
|---|---|---|
| 2015873 | 10/1970 | Fed. Rep. of Germany . |
| 0374169 | 6/1932 | United Kingdom . |
| 0688382 | 3/1953 | United Kingdom . |
| 879412 | 10/1961 | United Kingdom . |
| 920196 | 3/1963 | United Kingdom . |
| 938291 | 10/1963 | United Kingdom . |
| 1133349 | 11/1968 | United Kingdom . |
| 1133149 | 11/1968 | United Kingdom . |
| 1209064 | 10/1970 | United Kingdom . |
| 1238601 | 7/1971 | United Kingdom . |
| 1238630 | 7/1971 | United Kingdom . |
| 1307788 | 2/1973 | United Kingdom . |
| 1312584 | 4/1973 | United Kingdom . |
| 1346860 | 2/1974 | United Kingdom . |
| 1562826 | 3/1980 | United Kingdom . |
| 1593353 | 7/1981 | United Kingdom . |
| 2072280 | 9/1981 | United Kingdom . |
| 2113804 | 8/1983 | United Kingdom . |

Primary Examiner—Andres Kashnikow
Assistant Examiner—Robert J. Oberleitner
Attorney, Agent, or Firm—Solon B. Kemon

[57] ABSTRACT

A motor cycle disc brake has a disc secured by an outer peripheral portion to the rim of a wheel which is rotatable about an axle held by a pair of fork legs. A brake caliper is secured to a fork leg and straddles the inner periphery of the disc. The disc is secured to the wheel rim by bolts which allow the disc some axial play relative to the rim to compensate for any run out of the rim. The caliper is fixed to the fork leg by a pair of securing members one of which engages in a recess in a lug on the fork leg so that the caliper can be released quickly from the fork leg.

17 Claims, 10 Drawing Figures

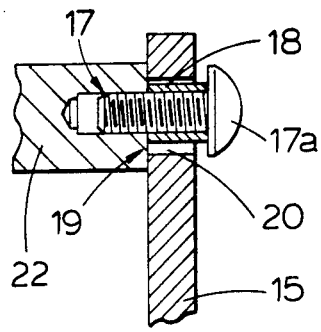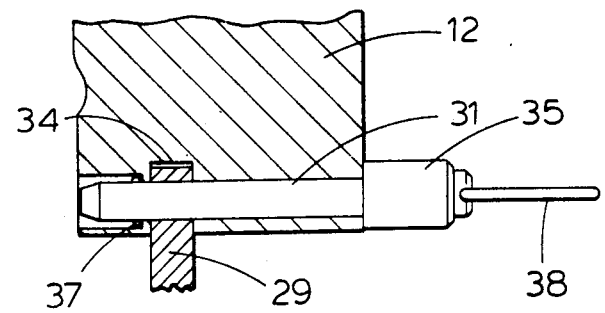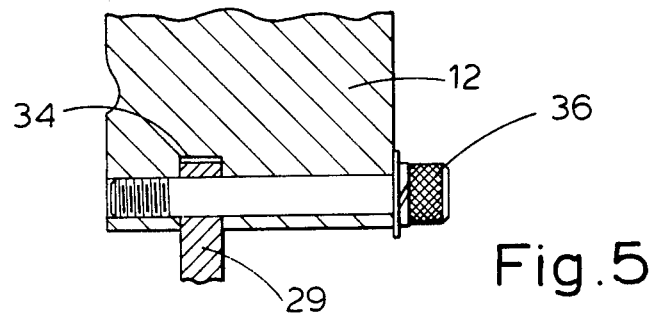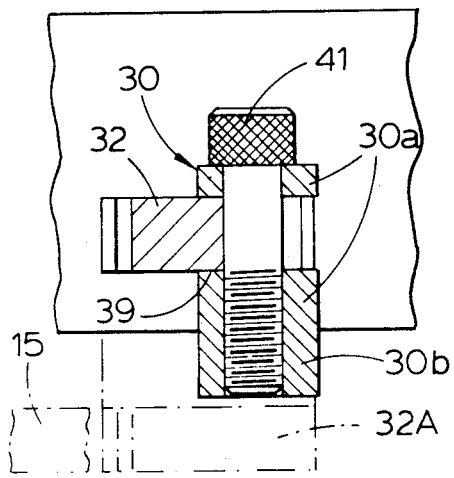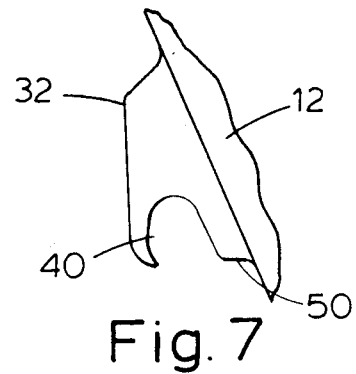

DISC BRAKE

This application is a continuation of application Ser. No. 571,724, filed Jan. 18, 1984, now abandoned.

The invention relates to a disc brake particularly, but not exclusively, for a motor cycle.

The use of disc brakes on motor cycles is now common. On high powered motor cycles it is known to use twin disc brakes with a disc and brake caliper arranged on each side of the motor cycle wheel. An example of such a braking arrangement is shown in U.K. Patent Application No. 2,072,280 where an annular disc is mounted on a wheel hub.

The basic hub mounted discs of the type described in the above Patent Application generally provide adequate braking capacity. However, as the speed capable of being achieved by motor cycles continues to increase, an improved braking system is necessary in order to cope with the required increase in braking capacity. One way of providing increased braking capacity is by increasing the diameter of the disc to enable braking force to be applied by a caliper at a greater radius. The increased diameter also provides a braking surface of increased circumferential length which provides improved dissipation of heat generated during braking. Increasing the diameter of the disc makes it less practical to mount the disc on the hub as proposed in the above Application. Another problem which arises when increasing the diameter of the disc is "run out" of the disc, i.e. misalignment of the disc relative to the caliper. An object of the present invention is to provide a disc brake in which the foregoing problems are substantially avoided.

According to one aspect of the invention there is provided a disc brake for a motor cycle wheel which is supported by a pair of fork legs for rotation about an axis, the disc brake comprising an annular disc having an outer peripheral portion adjacent the rim of the wheel, fastening means securing said outer peripheral portion to the rim and which allows the disc limited axial play relative to the rim, and a brake caliper on one said fork leg which straddles the inner periphery of said disc.

With such an arrangement the disc is fastened to the rim itself rather than the hub, the disc being adjacent the rim to provide optimum braking capacity. Moreover the problem associated with run out is eliminated to a very large extent by permitting said limited axial play of the disc.

Preferably the fastening means comprises a member which passes through one of said peripheral portion and rim and which locates in the other of said peripheral portion and rim. In such a case retaining means may be provided on the member, a spacer being provided which spaces the retaining means from the rim by a distance greater than the thickness of said radial portion to provide a clearance which facilitates said limited axial play. The member is preferably a bolt having a head which forms said retaining means. The direct mounting of the disc on the rim is a particularly convenient and cost effective way of securing the disc to the wheel. A further advantage of mounting the disc directly on the rim is that braking forces are not transmitted to the rim through the wheel spokes which reduces stress applied to the spokes The spacer provides a simple yet effective means of defining the desired clearance space to facilitate the axial play, the clearance space preferably being unoccupied so as to ensure that the axial play is substantially uninhibited. In that manner the disc will displace easily with minimal transmission of axial load to the caliper.

To facilitate radial thermal expansion of the annular disc, the peripheral portion preferably defines an opening through which the bolt passes and which is elongate in the radial direction so as to provide elongate spaced edges and to define a radial clearance between the member and the opening. The opening may extend radially inwardly from an outer edge of the peripheral portion. The opening in such a case is, therefore, a form of open-ended slot which assists in assembly of the disc on to the rim. The spacer may comprise a cylindrical tube through which the bolt passes or may comprise a tubular member having a pair of spaced flats which are slidably engageable with the elongate spaced edges of the opening. The sliding engagement permits the disc to expand radially as a result of thermal expansion during braking with minimal resistance and hence minimal risk of disc distortion. In order to inhibit transfer of heat from the disc to the rim the spacer may be formed from a material having low thermal conductivity.

Another problem associated with motor cycle disc brakes in particular is that if a wheel has to be removed to make, for example, a puncture repair then it is usually necessary to remove the brake caliper from its support (usually a fork leg stanchion) to enable the wheel to be removed. Also on some motor cycles it may be necessary to remove the caliper from its support to enable friction material pads to be replaced. U.S. Pat. No. 4,022,297 describes a brake where a caliper can be swung clear of the disc but the two securing members involved locate in apertures in lugs on a fork leg and, therefore, quick release of the caliper to enable pads to be changed rapidly—a particularly important requirement on racing motor cycles—cannot easily be effected.

Therefore, according to another aspect of the invention there is provided a disc brake for a wheel rotatable about an axis relative to a support, the disc brake comprising a brake disc for a wheel rotatable about an axis relative to a support, the disc brake comprising a brake disc on said wheel, a brake caliper adjacent the disc, spaced securing members securing said caliper to said support, and means on one of said calipers and support defining a recess locating one of said securing members whereby on release of the other securing member the caliper can be moved relative to the support to separate said one securing member and the recess. The use of a simple recess enables the caliper to be removed easily on release of only one securing member enabling rapid pad changes to be made. The recess also facilitates simple re-location of the caliper after a pad change has been made.

Preferably said recess is formed in a lug on the support. The recess may extend generally radially outwardly from an edge of the lug. The caliper may include spaced fingers which carry said one securing means and which receive said lug therebetween. In one embodiment the securing means comprises a bolt which is normally tightened so as to pinch the lug between said spaced fingers and which can be slackened to facilitate withdrawal of the bolt from said recess by said movement of the caliper relative to the support. In another embodiment the lug is axially aligned with the disc. In the latter case the securing means may be a pin resiliently mounted on the caliper.

For added speed when changing pads, the said other securing member may be a quick-release pin which passes through the caliper and said support.

A disc brake in accordance with the invention will now be described by way of example with reference to the accompanying drawings in which:

FIG. 3 is an enlarged portion of the disc as shown in FIG. 2 and fastening means therefor;

FIG. 4 is a section on the line IV—IV in FIG. 2 showing a quick release pin;

FIG. 5 is a section on the line IV—IV in FIG. 2 but showing use of a bolt instead of a quick release pin;

FIG. 6 is a section on the line VI—VI in FIG. 1;

FIG. 7 shows a lug on a fork leg;

FIG. 10 is a view similar to FIG. 1 showing the entire wheel.

Figure 1:
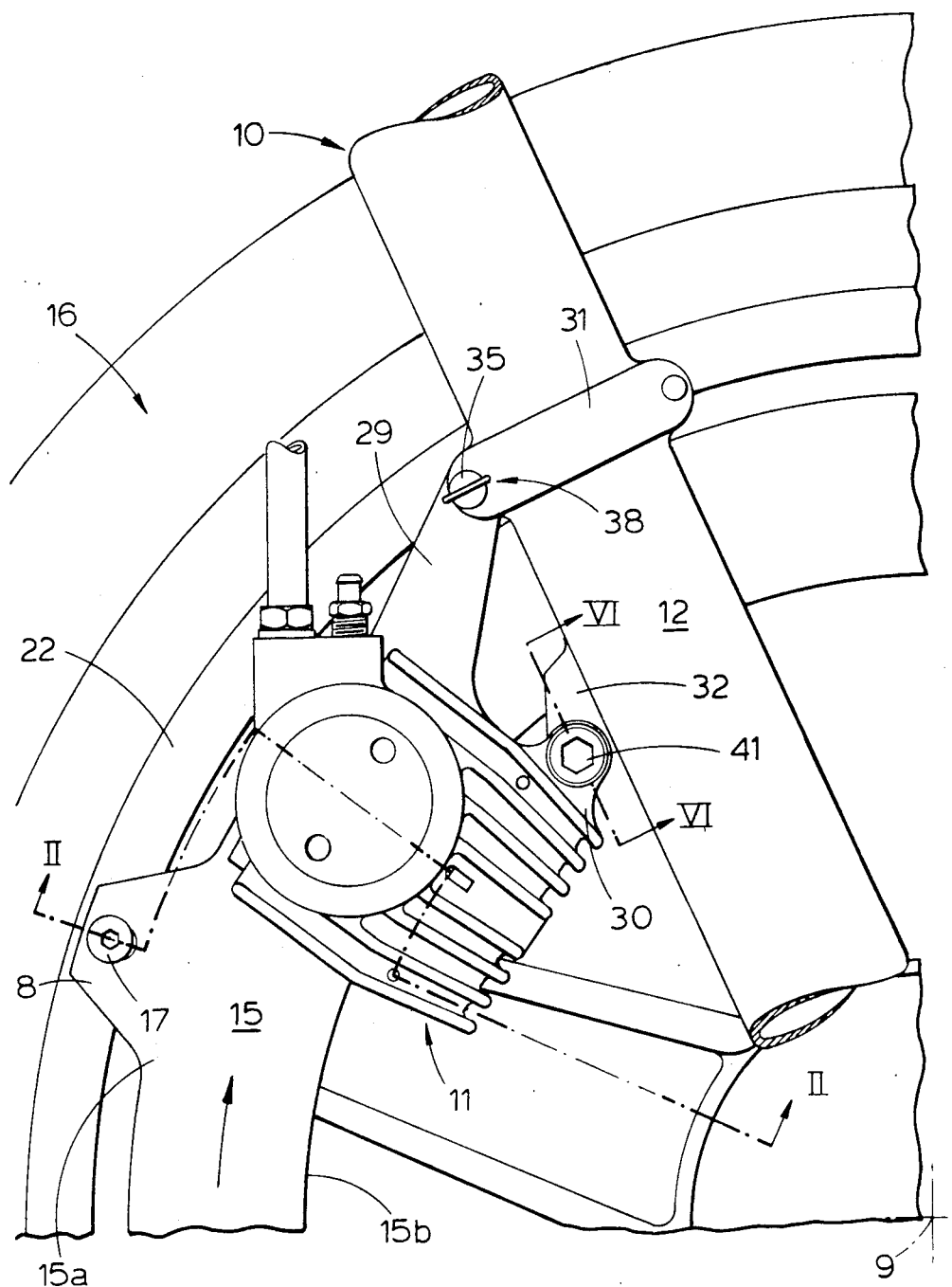
FIG. 1 is an elevation of part of a motor cycle fork and wheel showing a disc brake according to this invention in position.
Figure 2:
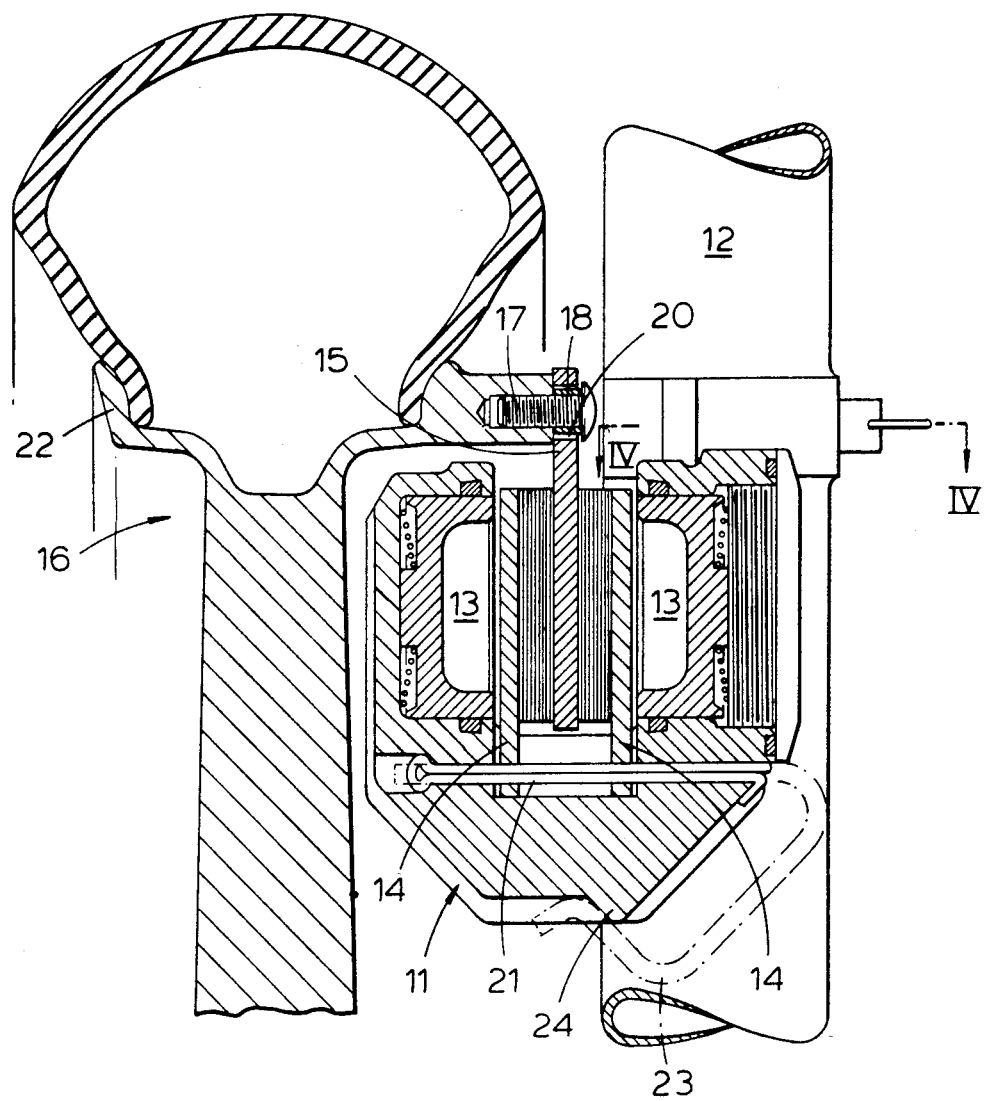
FIG. 2 is a radial section on the line II—II through the wheel and disc brake.

With reference to FIGS. 1 to 3, a disc brake caliper 11 is mounted on a stanchion 12 of a motor cycle fork leg 10. The brake caliper 11 is of the type in which two opposed hydraulic cylinder 13 are arranged to press friction pads 14 against opposed friction faces of a disc 15.

The disc 15 is an annular disc having its outer peripheral margin 15a adjacent and fastened to the rim 22 of a wheel 16 through radial projections 8. The wheel rotates about an axis 9 defined by an axle (not shown) held by a pair of fork legs, the stanchion of only one of which is shown. The wheel 16 is made of cast aluminium alloy but could be formed by other methods. A plurality e.g. ten or twelve, circumferentially spaced bolts 17 having heads 17a are used for fastening the disc to the wheel rim. Each bolt 17 passes through a spacer bush 18 which is of a greater length than the thickness of the associated projection 8 of the disc so that when the bolt is screwed against the bush, the head 17a of the bolt 17 is spaced from the wheel rim 16 by a distance providing between 0.003" and 0.013" (0.08 mm–0.330 mm) clearance in excess of the thickness of the projections 8 which will normally correspond to the thickness of the disc. This clearance allows the disc to move axially relative to the rotation of the wheel about the axis 9 and thereby compensate for any wheel run out within the above limits relative to the fork stachion 12. The bushes 18 pass through radially elongate holes 19 in the disc to provide radial clearance 20 (e.g. 0.05"–0.06" (1.25 mm–1.50 mm)) between the radially inner end of each hole and the adjacent surface of the bush therein. The elongate radial edges of each hole 19 are spaced so as to receive the associated bush with only slight working clearance so that the bushes locate the disc circumferentially.

The caliper 11 straddles the inner periphery 15b of the disc and the pads 14 are held in the caliper by split pins 21 which pass axially through the bottom of the caliper. The pads 14 may be withdrawn from the caliper by removing the split pins 21 and withdrawing the pads radially outwardly relative to the wheel.

Alternatively the pads may be held in position by spring clips 23 (one of which is shown in broken outline in FIG. 2) which pass through the caliper in the same manner as the split pins 21, but clip over a detent 24 on the outer surface of the caliper. The clip 23 provides a quick means of releasing the pads from the caliper by merely withdrawing the spring clip 23 over the detent 24.

The caliper 11 is secured to the fork stanchion 12 on that side of the fork such that on application of the brake with motor cycle moving forward the torque load pushes the caliper against the stanchion. The caliper 11 has two spaced arms 29 and 30 which are secured to a pair of lugs 31 and 32 respectively on the fork stanchion 12.

The upper arm 29 is received in slot 34 in the lug 31 and is held in place by a proprietory quick release pin 35 known as an AVDEL pin (FIG. 4). The AVDEL pin has a pair of diametrically opposed balls 37 which can be moved radially in and out of the pin body to either lock or release the pin from its desired position. The pin is operated by means of a wire ring 38 attached to a spring loaded case in the pin.

The lower arm 30 (FIG. 6) comprises two fingers 30a, 30b which define a slot 39. The slot 39 receives the lug 32 on the stanchion 12. The lug 32 (FIG. 7) is formed with a recess comprising an open ended slot 40 and the lug is positioned on the stanchion 12 so as to be axially off set from the disc 15. The slot 40 extends generally radially outwardly from a radially inner edge 50 of the lug 32. A pinch bolt 41 passes through the fingers 30a, 30b of caliper arm 30 and through the slot 40. Tightening of the pinch bolt 41 clamps the fingers 30a, 30b against the lug 32 to secure the caliper. The clamping of the arm 30 in that way against the lug 32 helps prevent the caliper tilting when the brakes are applied.

In an alternative construction the lug 32A (see broken lines, FIG. 6) is moved to be axially in line with the disc 15 thereby making it unnecessary to use a pinch bolt to prevent tilting since the clamping action of the caliper when braking is in line with the lug 32A. Therefore an ordinary pin could be accommodated resiliently in a plastic or rubber sleeve in the caliper body.

To remove the caliper quickly from the stanchion 12, the quick release pin 35 is removed from the lug 31, and the pinch bolt 41 is slackened allowing the caliper to be swivelled clear of lug 32 and moved radially inwardly to displace the bolt 41 out of the lower end of slot 40. That arrangement allows the caliper to be removed quickly and easily from the stanchion.

Such a quick release system is particularly useful on racing motor cycles in which a rapid change of pads 14 may be necessary. For road bikes the quick release pin 35 may be replaced by a bolt 36 (see FIG. 5).

Figure 8:
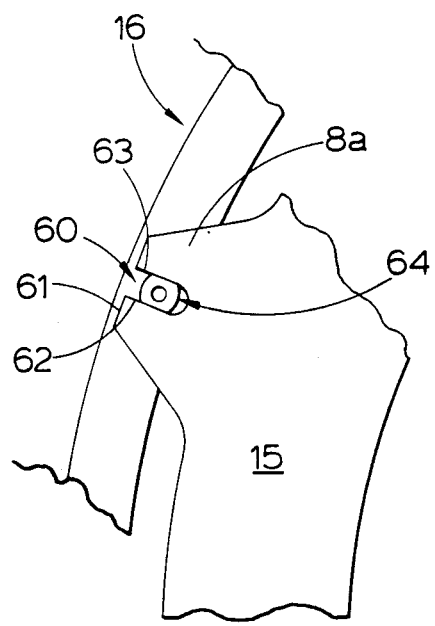
FIG. 8 shows part of a disc and rim housing an alternative form of radial projection.
Figure 9:
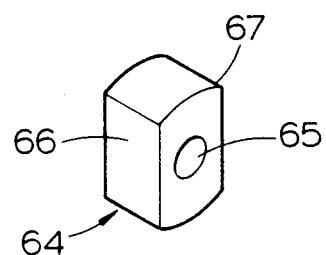
FIG. 9 is a perspective view of an alternative form of spacer for use in the arrangement shown in FIG. 8.

FIG. 8 illustrates and alternative form of radial projection 8a. Instead of being formed with an opening in the form of an aperture as shown in FIGS. 1 and 3, the opening (indicated at 60) extends radially inwardly from an outer edge 61 of the projection 8a. The opening has parallel edges 62, 63. In this embodiment the spacer bush 64 has a bore 65 for the bolt 17 (not shown in FIGS. 8 and 9) and two parallel flats 66, 67. The edges 62, 63 of the slot 60 are spaced so as to receive the spacer bush 64 with only slight working clearance between the edges 62, 63 and the adjacent flats 66, 67. During braking, a flat on one side of each bush will be urged towards the adjacent edge of the associated opening 60. As the temperature of the disc begins to rise during braking, the disc will expand radially and the said adjacent edge of the opening will slide along the flat of its bush. The face contact enables such sliding to take place easily so that there is minimal risk of disc distortion during thermal expansion. To reduce transfer of heat from the disc to the rim, the spacer bushes 18, 64 may be made from a material having low thermal conductivity, e.g. titanium.

The form of opening 60 shown in FIG. 8 may assist in assembly or removal of the disc. For example if there are three equi-spaced securing bolts 17 only one need be completely removed and the other two merely slackened to enable the disc to be removed. That feature is of advantage where rapid disc-change is required when racing.

Whilst the invention has been described utilising bolts 17 and suitable bushes as the means for fastening the disc to the wheel rim it is envisaged that other suitable fastening means such as shouldered bolts and shoulder studs could be used as ready alternatives.

What I claim as my invention and desire to secure by Letters Patent in the United States is:

1. A disc brake for a motorcycle wheel which is supported by a pair of fork legs for rotation about an axis, the disc brake comprising an annular disc having opposite sides and an outer peripheral portion, fastening means securing said outer peripheral portion to said wheel, said fastening means allowing said disc limited axial play relative to said wheel, a brake caliper mounted on one of said fork legs, in operative position said caliper being stationary relative to said one of said fork legs, said caliper having a bridge portion which straddles an inner periphery of said disc and leg portions extending from the bridge adjacent said opposite sides of said disc, each said leg portion carrying at least one hydraulically actuated piston, said pistons being operable to press friction pads against the opposite sides of the disc, said fastening means comprising members which locate in said wheel, said peripheral portion defining openings each extending through said disc in a direction axially of the disc, a respective said member passing through each said opening, each said opening being elongated in the radial direction so as to provide elongate spaced edges and so as to define a radial clearance between said opening and said member therein, and each said opening extending radially inwardly to form a radial slot to facilitate radial thermal expansion of the disc and to facilitate assembly of the disc onto the wheel.

2. A disc brake according to claim 1 wherein each said slot extends radially inwardly from an outer edge of said outer peripheral portion whereby said slot is open-ended at its radially outer end.

3. A disc brake according to claim 1 wherein said caliper has arms secured to said one of said fork legs whereby a torque load will act on the caliper along a direction towards said fork leg on application of the brake with the disc rotating in the direction for forward movement of the motor cycle.

4. A disc brake according to claim 1 wherein each said member is provided with retainer means provided on the member, a spacer is penetrated by the member to space the retainer means from the wheel by a distance greater than the thickness of said peripheral portion of the disc to permit said limited axial play and said spacer is disposed in a said slot.

5. A disc brake according to claim 1 wherein said outer peripheral portion of the disc has a plurality of circumferentially spaced radial projections each said projection having a said slot therein, retainer means provided on each member, a spacer for each retainer and penetrated by the corresponding member to space each retainer means from the wheel by a distance greater than the thickness of the said peripheral portion of the disc to permit said limited axial play, each said spacer being disposed in a respective said slot, and said members being releasable to allow removal of the disc from the wheel, following removal of the caliper, whereby said disc can be replaced by a similar disc.

6. A disc brake according to claim 1 wherein the axial play of said disc is limited to less than the axial thickness of an unworn friction pad.

7. A disc brake according to claim 1 wherein the limited axial play does not exceed 0.33 MM.

8. A disc brake according to claim 7 wherein the limited axial play is in the range of 0.08 MM to 0.330 MM.

9. A disc brake for a motorcycle wheel which is supported by a pair of fork legs for rotation about an axis, said wheel including a rim, the disc brake comprising an annular disc having opposite sides and an outer peripheral portion adjacent said rim, fastening means securing said outer peripheral portion to said rim, said fastening means allowing said disc limited axial play relative to said rim, a brake caliper mounted on one of said fork legs, in operative position said caliper being stationary relative to said one of said fork legs, said caliper having a bridge portion which straddles an inner periphery of said disc and leg portions extending from the bridge adjacent said opposite sides of said disc, each said leg portion carrying at least one hydraulically actuated piston, said pistons being operable to press friction pads against the opposite sides of the disc, said fastening means comprising members which locate in said rim, said peripheral portion defining openings each extending through said disc in a direction axially of the disc, a respective said member passing through each said opening, each said opening being elongated in the radial direction so as to provide elongate spaced edges and so as to define a radial clearance between said opening and said member therein, and each said opening extending radially inwardly to form a radial slot to facilitate radial thermal expansion of the disc and to facilitate assembly of the disc onto the rim.

10. A disc brake for a motorcycle wheel, said wheel being supported by a pair of fork legs for rotation about an axis, the disc brake comprising an annular disc having opposite sides and an outer peripheral portion, fastening means securing said outer peripheral portion to said wheel, said fastening means allowing said disc limited axial play relative to said wheel, a brake caliper mounted on one of said fork legs, said caliper having first and second arms, a bridge portion which straddles an inner periphery of said disc and leg portions extending from said bridge adjacent said opposite sides of said disc, one of said arms extending from one of the leg portions and the other of said arms extending from said bridge portion, the said arms being secured to the said one of said fork legs to prevent axial movement of the caliper relative thereto, and the caliper being removable from one of said fork legs upon release of said arms in an operative position, said caliper being stationary relative to said fork legs, each said leg portion carrying at least one hydraulically actuated piston, said pistons being operable to press friction pads against the opposite sides of the disc, said fastening means comprising members which locate in said wheel, said peripheral portion defining openings extending through said disc in a direction axially of the disc, a respective said member passing through each said opening, each said opening being elongated in the radial direction so as to provide elongate spaced edges and so as to define a radial clearance between said opening and said member therein, each said opening extending radially inwardly to form a radial slot to facilitate radial thermal expansion of the disc and to facilitate assembly of the disc onto the wheel.

11. A disc brake according to claim 10 wherein each said slot extends radially inwardly from an outer edge of said outer peripheral portion whereby said slot is openended at its radially outer end.

12. A disc brake according to claim 10 wherein a pair of caliper supports is provided on one of the fork legs, each of said supports co-operating with a respective one of said arms to locate the caliper with said bridge portion straddling the inner periphery of the disc and said leg portions extending adjacent opposite faces of the disc, the caliper being held by said supports and said arms against axial movement relative to the said one of the fork legs, one of said supports including an open-ended slot, said one of said arms having a pair of fingers embracing said one of said suports, and said arms having a pair of fingers embracing said one of said suports, and said fingers having apertures aligned with said slot to receive a pinch bolt to hold the fingers against the said one of said supports.

13. A disc brake according to claim 12 wherein said one of said suports is in the plane of the disc.

14. A disc brake according to claim 12 wherein the other of said supports includes a slot, the other of said arms being slidably received in said slot, the other of said supports and the said other of said arms being apertured to receive a quick-release coupling, and the coupling being removable to permit the said other of said amrs to pivot about said pinch bolt after said bolt has been loosened to release the hold of the fingers against the said one of the supports.

15. A disc brake according to claim 14 wherein said quick-release coupling is releasable solely by axial movement.

16. A disc brake according to claim 15 wherein said quick-release coupling is a quick-release pin.

17. A disc brake for a motorcycle wheel which is supported by a pair of fork legs for rotation about an axis, the disc brake comprising an annular disc having opposite sides and an outer peripheral portion, fastening means securing said outer peripheral portion to said wheel, said fastening means allowing said disc limited axial play relative to said wheel, a brake caliper mounted on one of said fork legs, in operative position said caliper being stationary relative to said one of said fork legs, said caliper having a bridge portion which straddles an inner periphery of said disc and leg portions extending from the bridge adjacent said opposite sides of said disc, each said leg portion carrying at least one hydraulically actuated piston, said pistons being operable to press friction pads against the opposite sides of the disc, said fastening means comprising members which locate in said wheel, said peripheral portion defining openings each extending through said disc in a direction axially of the disc, a respective said member passing through each said opening, each said opening being elongated in the radial direction so as to provide elongate spaced edges and so as to define a radial clearance between said opening and said member therein, each said opening extending radially inwardly to form a radial slot to facilitate radial thermal expansion of the disc and to facilitate assembly of the disc onto the wheel, said caliper having first and second arms secured to said one of said fork legs whereby a torque load will act on the caliper along a direction towards said fork leg on application of the brake with the disc rotating in the direction for forward movement of the motorcycle, one of said arms extending from one of the leg portions and the other of said arms extending from said bridge portion, the said arms being secured to the said one of said fork legs to prevent axial movement of the caliper relative thereto, and the caliper being removable from one of said fork legs upon release of said arms.

* * * * *